United States Patent
Sardanelli et al.

(10) Patent No.: US 6,321,487 B1
(45) Date of Patent: Nov. 27, 2001

(54) GROWTH MEDIUM MOISTURE REPLACEMENT SYSTEM

(75) Inventors: Sandra Sardanelli; Thomas W. Atkins, both of Beltsville; William J. Kenworthy, Greenbelt, all of MD (US)

(73) Assignee: University of Maryland, College Park, MD (US)

( * ) Notice: Subject to any disclaimer, the term of this patent is extended or adjusted under 35 U.S.C. 154(b) by 0 days.

(21) Appl. No.: 09/271,378

(22) Filed: Mar. 18, 1999

Related U.S. Application Data

(60) Provisional application No. 60/086,210, filed on May 21, 1998, and provisional application No. 60/078,358, filed on Mar. 18, 1998.

(51) Int. Cl.⁷ .................................................. A01G 25/00
(52) U.S. Cl. ............................................................ 47/81
(58) Field of Search .................................. 47/87, 79, 81, 47/66.5, 61, 60

(56) References Cited

U.S. PATENT DOCUMENTS

| | | | | |
|---|---|---|---|---|
| 3,739,524 | * | 6/1973 | Rose | 47/81 |
| 3,786,598 | * | 1/1974 | Stadelhofer | 47/81 |
| 3,857,196 | * | 12/1974 | Alkire | 47/48.5 |
| 4,052,818 | * | 10/1977 | Hagerty | 47/81 |
| 4,067,143 | * | 1/1978 | Alwell | 47/79 |
| 4,219,964 | * | 9/1980 | Dale | 47/81 |

(List continued on next page.)

FOREIGN PATENT DOCUMENTS

| | | | |
|---|---|---|---|
| 3200923 | * | 7/1983 | (DE) . |
| 3525266 | * | 1/1987 | (DE) . |
| 126574 | * | 5/1984 | (EP) . |
| 2030037 | * | 4/1980 | (GB) . |
| 2045043 | * | 10/1980 | (GB) . |
| 2095083 | * | 9/1982 | (GB) . |
| 2107962 | * | 5/1983 | (GB) . |
| 2198324 | * | 6/1988 | (GB) . |
| 2223388 | * | 4/1990 | (GB) . |

OTHER PUBLICATIONS

J. Halbrendt et al., "*Heterodera glycines*–Soybean Association: A Rapid Assay Using Prunned Seedlings" in Journal of Nematology, 18 (3):370–374, 1986.

R.D. Riggs et al., "Variability in Race Tests with *Heterodera glycines*" in Journal of Nematology 20 (4):565–572, 1988.

R.D. Riggs et al., "Optimization of the *Heterodera glycines* Race Test Procedure" in Journal of Nematology 23 (2): 149–154, 1991.

Supplement to the Journal of Nematology 29(4S), pp. 625–634 (1997).

*Primary Examiner*—Charles T. Jordan
*Assistant Examiner*—Francis T. Palo
(74) *Attorney, Agent, or Firm*—Dykema Gossett PLLC

(57) ABSTRACT

A growth medium moisture replacement system particularly useful in bioassays for Heterodera glycines—Glycine female development includes a first container of growth medium for soybean cultivars, an enclosed second container for water, and a wick which extends upwardly from the water in the second container into the growth medium in the first container to replace moisture in the growth medium after establishment of a hydraulic gradient. The wick includes a rope member having an impermeable sheath around a middle portion of the rope member, leaving its ends uncovered, and sealed to an opening in the bottom of the first container. Another related growth medium moisture replacement system involves an enclosed container for water having a tube extending downwardly from within the container and sealingly through an opening in the bottom of the container to an end having holes therein, and a wick which extends first upwardly in the container and then downwardly in the tube to an end near the end of the tube to deliver moisture from within the container downwardly into the growth medium in which the tube extends.

11 Claims, 7 Drawing Sheets

U.S. PATENT DOCUMENTS

| | | | |
|---|---|---|---|
| 4,231,187 | * 11/1980 | Greenbaum | 47/80 |
| 4,328,640 | * 5/1982 | Revelle | 47/1.5 |
| 4,344,251 | * 8/1982 | Edling | 47/80 |
| 4,527,354 | * 7/1985 | Sellier | 47/81 |
| 4,531,324 | * 7/1985 | Yang et al. | 47/81 |
| 4,557,071 | * 12/1985 | Fah | 47/81 |
| 4,741,125 | * 5/1988 | Demorest | 47/81 |
| 4,791,755 | * 12/1988 | Bilstein | 47/79 |
| 4,829,709 | * 5/1989 | Centafanti | 47/79 |
| 4,916,858 | * 4/1990 | Hobson | 47/81 |
| 4,932,159 | * 6/1990 | Holtkamp, Sr. | 47/81 |
| 4,937,974 | * 7/1990 | Costa, Jr. et al. | 47/81 |
| 5,002,814 | * 3/1991 | Knack et al. | 428/85 |
| 5,117,581 | * 6/1992 | Green et al. | 47/79 |
| 5,264,210 | * 11/1993 | Novitski et al. | 424/93 N |
| 5,341,596 | * 8/1994 | Kao | 47/79 |
| 5,375,371 | * 12/1994 | Wells | 47/81 |
| 5,542,605 | * 8/1996 | Campau | 239/44 |
| 5,673,511 | * 10/1997 | Holtkamp, Jr. | 47/18 |
| 5,918,415 | * 7/1999 | Locke et al. | 47/79 |

* cited by examiner

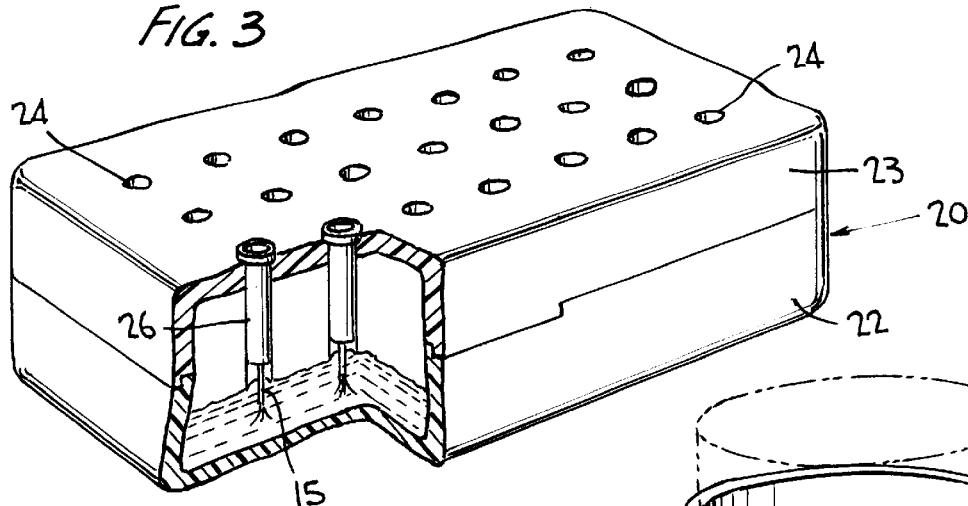
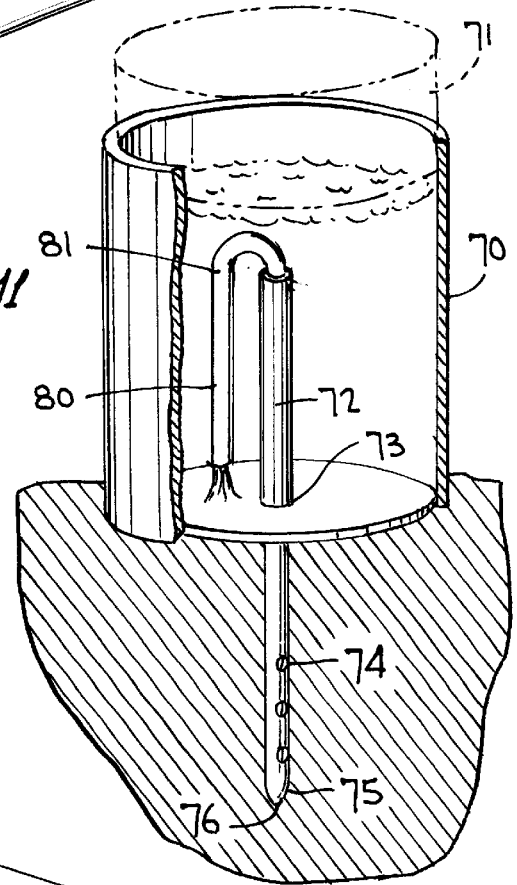
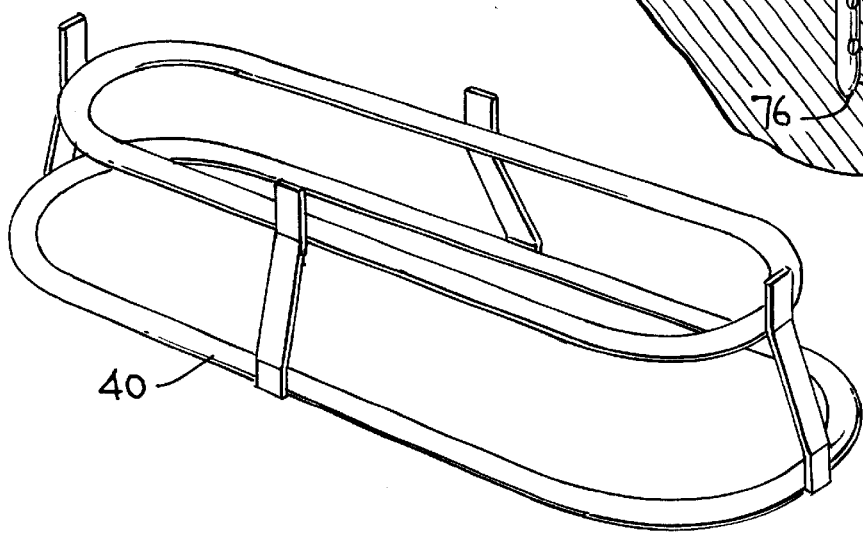

MEAN DAILY WATER FLOW FOR SAND AND MIX TREATMENTS FROM THE WICK WATERING SYSTEMS IN EXPERIMENT ONE, PART A, IN THE GROWTH CHAMBER.

MEAN MOISTURE VOLUME PERCENTAGE AND DAILY ML. $H_2O$ USE AT THE ONSET AND FOR TOTAL DAYS RUNNING FOR MIX VS. SAND IN PART A OF THE GROWTH CHAMBER STUDY.

FIG. 14

MEAN DAILY WATER FLOW FROM WICK WATERING SYSTEM AND MOISTURE VOLUME PERCENTAGE FOR MIX TREATMENT IN THE GROWTH CHAMBER STUDY, EXPERIMENT ONE, PART A.

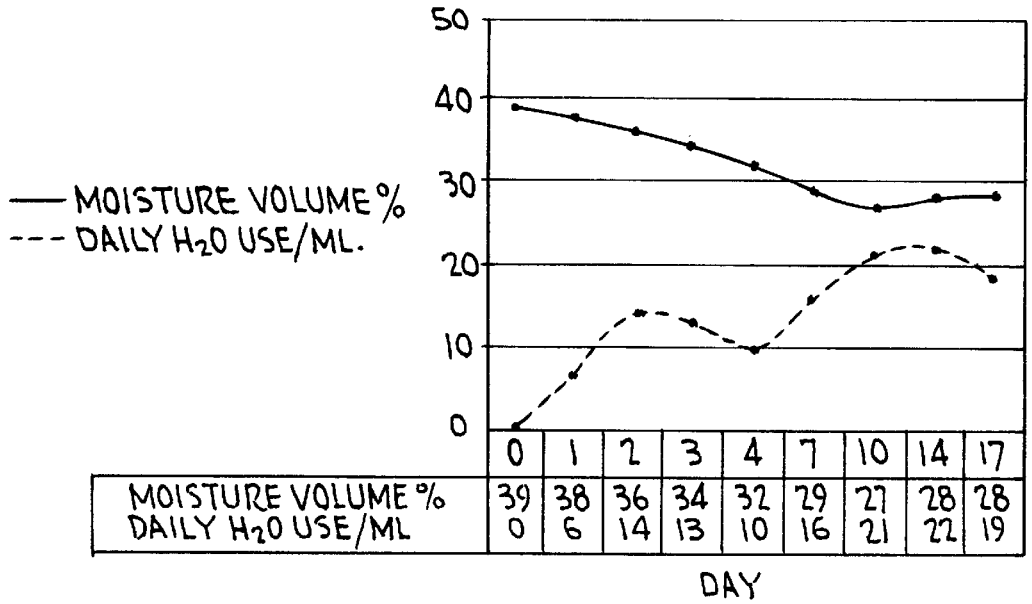

| DAY | 0 | 1 | 2 | 3 | 4 | 7 | 10 | 14 | 17 |
|---|---|---|---|---|---|---|---|---|---|
| MOISTURE VOLUME % | 39 | 38 | 36 | 34 | 32 | 29 | 27 | 28 | 28 |
| DAILY $H_2O$ USE/ML | 0 | 6 | 14 | 13 | 10 | 16 | 21 | 22 | 19 |

FIG. 15

MEAN DAILY WATER FLOW FROM WICK WATERING SYSTEM AND MOISTURE VOLUME PERCENTAGE FOR SAND TREATMENT IN THE GROWTH CHAMBER STUDY, EXPERIMENT ONE, PART A.

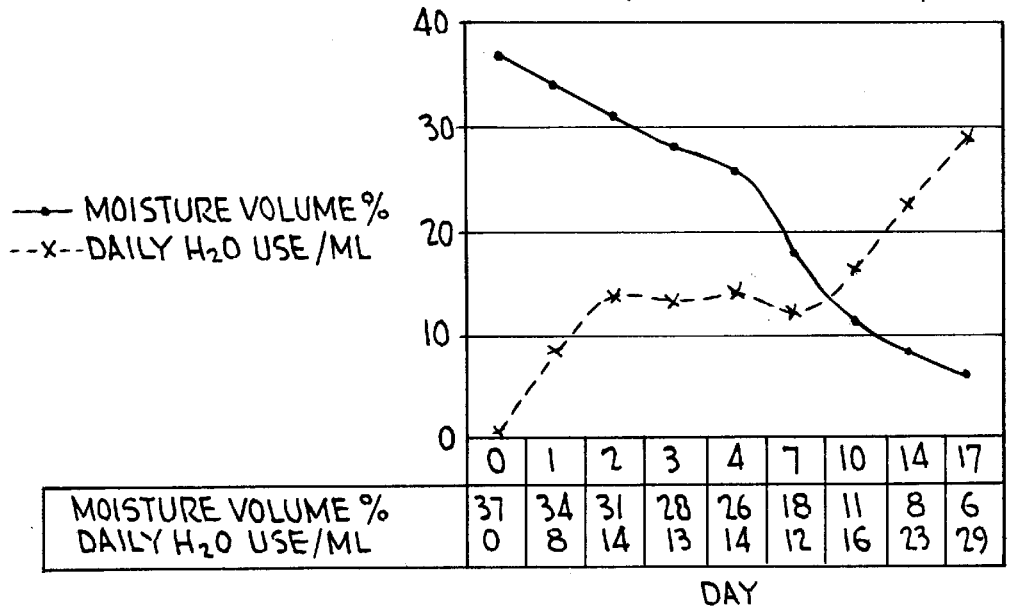

| DAY | 0 | 1 | 2 | 3 | 4 | 7 | 10 | 14 | 17 |
|---|---|---|---|---|---|---|---|---|---|
| MOISTURE VOLUME % | 37 | 34 | 31 | 28 | 26 | 18 | 11 | 8 | 6 |
| DAILY $H_2O$ USE/ML | 0 | 8 | 14 | 13 | 14 | 12 | 16 | 23 | 29 |

MEAN MOISTURE VOLUME PERCENTAGES FOR SAND AND MIX EXPERIMENTAL UNITS REHYDRATED AND REPLACED INTO THE GROWTH CHAMBER WITHOUT WATER SUPPLEMENT FOR PART B OF EXPERIMENT ONE.

MEAN MOISTURE VOLUME PERCENTAGE FOR MIX WITH (+) AND WITHOUT (−) WICK WATERING SYSTEMS IN THE HOUSEHOLD ENVIRONMENT STUDY.

FIG. 18

% REMAINING OF INITIAL MOISTURE VOLUME PERCENTAGE FOR MEDIA IN THE GROWTH CHAMBER, EXPERIMENT ONE, PART A, (WITH THE WICK WATERING SYSTEM) AND PART B (WITHOUT THE WICK WATERING SYSTEM).

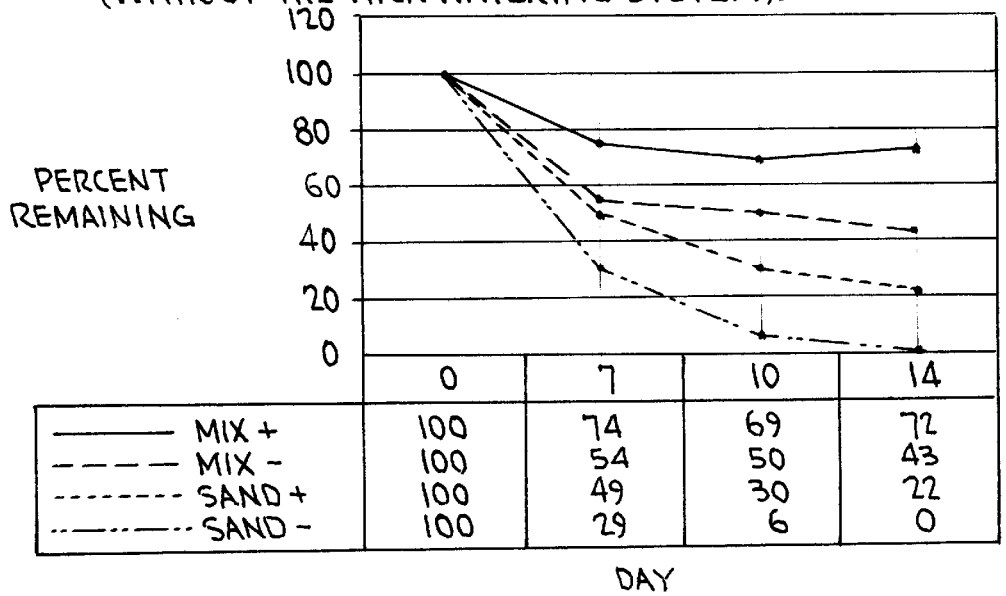

| DAY | 0 | 7 | 10 | 14 |
|---|---|---|---|---|
| MIX + | 100 | 74 | 69 | 72 |
| MIX − | 100 | 54 | 50 | 43 |
| SAND + | 100 | 49 | 30 | 22 |
| SAND − | 100 | 29 | 6 | 0 |

FIG. 19

% REMAINING OF INITIAL MOISTURE VOLUME PERCENTAGE (52%) FOR FARFARD MIX #3 WITH (+) AND WITHOUT (−) WICK WATERING SYSTEMS IN THE HOUSEHOLD ENVIRONMENT STUDY.

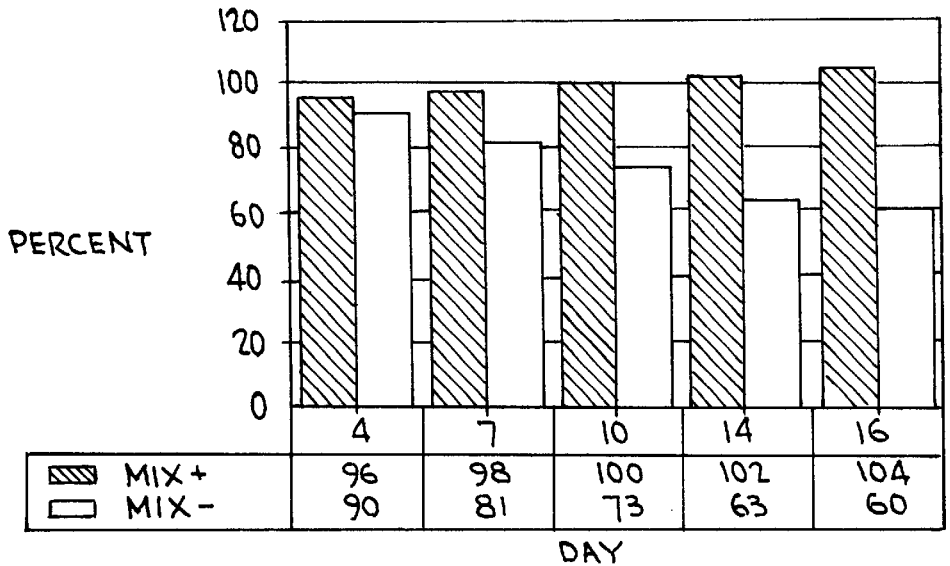

| DAY | 4 | 7 | 10 | 14 | 16 |
|---|---|---|---|---|---|
| MIX + | 96 | 98 | 100 | 102 | 104 |
| MIX − | 90 | 81 | 73 | 63 | 60 | ized
GROWTH MEDIUM MOISTURE REPLACEMENT SYSTEM

This application claims the benefit of the filing date of U.S. Provisional Application No. 60/078,358, filed Mar. 18, 1998 and U.S. Provisional Application No. 60/086,210, filed May 21, 1998.

BACKGROUND OF THE INVENTION

1. Field of the Invention

The invention relates to systems for automatically replacing moisture in a plant growth medium such as soil or sand.

2. The Prior Art

It is well known that the successful growth of certain types of plants requires rooting in a growth medium, e.g., soil or sand, which is kept constantly moist. In order to maintain the moisture level in such growth mediums, systems have been developed which will automatically convey moisture from a reservoir to the growth medium. However, such known systems have in some instances been complicated and expensive, or else fail to deliver the proper amount of moisture to maintain the moisture level in the growth medium at the desired level.

It is an object of the present invention to provide a growth medium moisture replacement system which will satisfy these needs.

SUMMARY OF THE INVENTION

In accordance with a first variation present invention, a moisture replacement system includes a first container containing a plant growth medium such as soil or sand, an enclosed second container containing water, and a wick which extends upwardly from the water in the second container into the growth medium in the first container so as to wick moisture upwardly therethrough and into the growth medium, i.e., after establishment of a hydraulic gradient.

In accordance with a second variation of the present invention, a moisture replacement system includes a first container containing water, a second container containing a plant growth medium such as soil or sand, and a wick which extends first upwardly in the first container and then downwardly into the growth medium in the second container so as to supply moisture thereto.

Further features and advantages of the invention will be understood by reference to the accompanying drawings taken in conjunction with the ensuing discussion.

BRIEF DESCRIPTION OF THE DRAWINGS

FIG. 3 is a perspective view, partially broken away, of another embodiment of a moisture replacement system in accordance with the first variation of the invention, a plurality of containers of plant growth medium being used in conjunction with an enclosed container or reservoir of water, FIG. 6 is a perspective view of a support rack which can be used to support the holding rack of the reservoir (with growth medium containers) when removed from the bottom tray, FIG. 11 shows a schematic view of a growth medium moisture replacement apparatus according to a second variation of the invention, FIG. 14 shows mean daily water flow from wick watering system and moisture volume percentage for mix treatment in the Growth Chamber study, Experiment One, Part A, FIG. 15 shows mean daily water flow from wick watering system and moisture volume percentage for sand treatment in the Growth Chamber study, Experiment One, Part A, FIG. 18 shows % remaining of initial moisture volume percentage for media in the Growth Chamber, Experiment One, Part A (with the wick watering system) and Part B (without the wick watering system), and FIG. 19 shows % remaining of initial moisture volume percentage (52%) for Farfard Mix #3 with (+) and without (−) wick watering systems in the household environment study.

DETAILED DISCUSSION OF THE PREFERRED EMBODIMENTS

A. First Variation of Growth Medium Moisture Replacement System (MRS)

The first variation, seen best in FIGS. 1 and 3–5, are derived from investigations relating to the soybean cyst nematode. A discussion of these investigations now follows.

Management of the soybean cyst nematode, Heterodera glycines Ichinohe, is a principal factor in the production of soybean. Reported as a pathogen to soybean worldwide, *H. glycines* has been detected in most soybean-producing states in the United States.

Variable development of females of *H. glycines* on soybean cultivars has been reported from existing race test methods. Standardization of seeding, inoculation and temperature regimens in race testing have been studied. Although optimum procedures or levels for these parameters were identified, the numbers of females reported in the tests were quite variable. The effect of soil moisture on *H. glycines* bioassay performance was not examined.

The lack of consistency or the variation in the numbers of females reported in bioassays of *H. glycines* population levels in a soil or in race tests may be related to the following: (i) lack of consistency in watering practices (widely fluctuating soil moisture levels), (ii) variability in seed germination and subsequent plant growth with direct seeding practices, and (iii) the possibility of undetected root injury during transplant of test seedlings.

In an effort to address the above, a soil moisture replacement system was designed and tested wherein the underlying principle of the system was the transport of water via wicking, after establishment of a hydraulic gradient, from an enclosed bottom reservoir upward to a rooting or growth medium.

The main objectives in testing the apparatus were to evaluate: i) the efficacy for soil moisture replacement over time; ii) the practice of direct seeding and quality of subsequent plant growth within the system; iii) *H. glycines* life cycle completion as manifested in female maturation; and iv) the system efficiency in conservation of materials, space, and labor.

Figure 1:
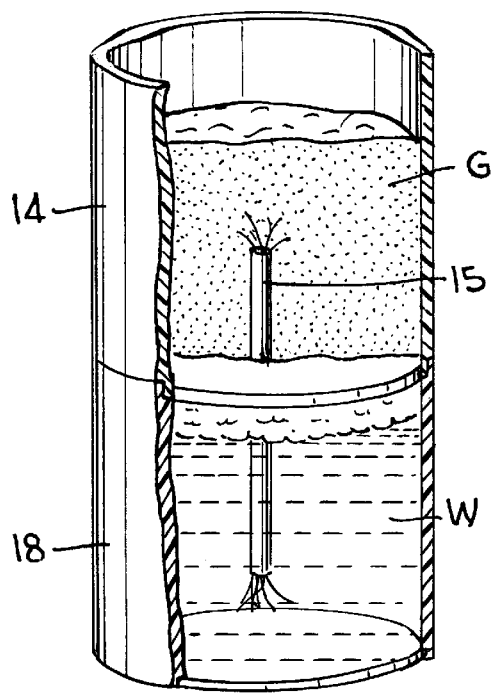
FIG. 1 is a perspective view, partially broken away, of an embodiment of a moisture replacement system in accordance with the first variation of the invention, a single container of plant growth medium being used in conjunction with an enclosed container or reservoir of water.

FIG. 1 shows the developed moisture replacement system in its simplest form. A first container 14 containing plant growth medium G is positioned above an enclosed container (reservoir) 18 containing water W and a wick 15 extends from an upper end located in the plant growth medium through an opening in the bottom of the container to a lower end in the water in the enclosed container 14.

Figure 2:
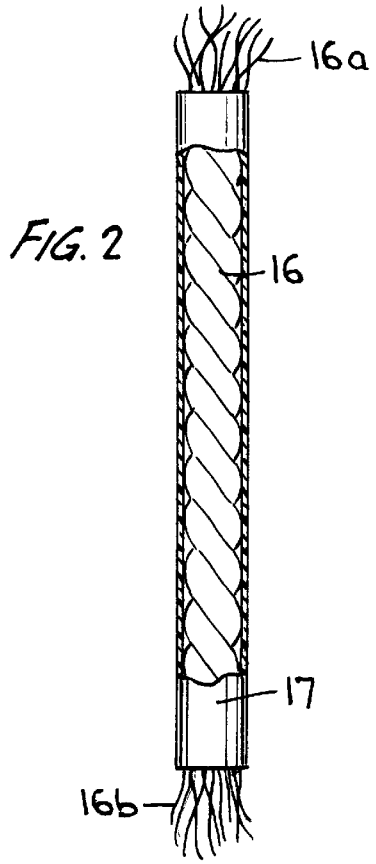
FIG. 2 is an view, partially broken away, of the wick used in moisture replacement system of FIG. 1.

FIG. 2 shows the wick 15, which is made of nylon rope 16 that is coated along most of its length with polyolefin sheath 17, leaving the ends 16a, 16b exposed.

Figure 4:
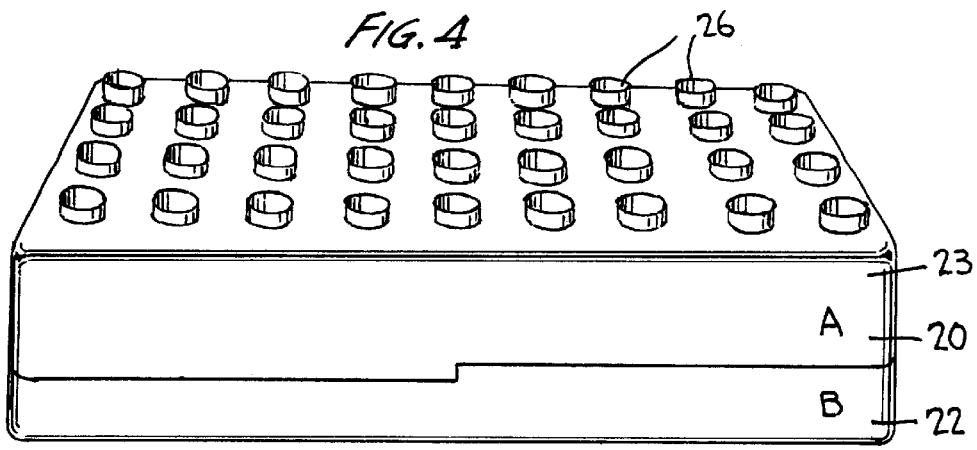
FIG. 4 shows another perspective view of the embodiment of FIG. 3 from a different angle.
Figure 5:
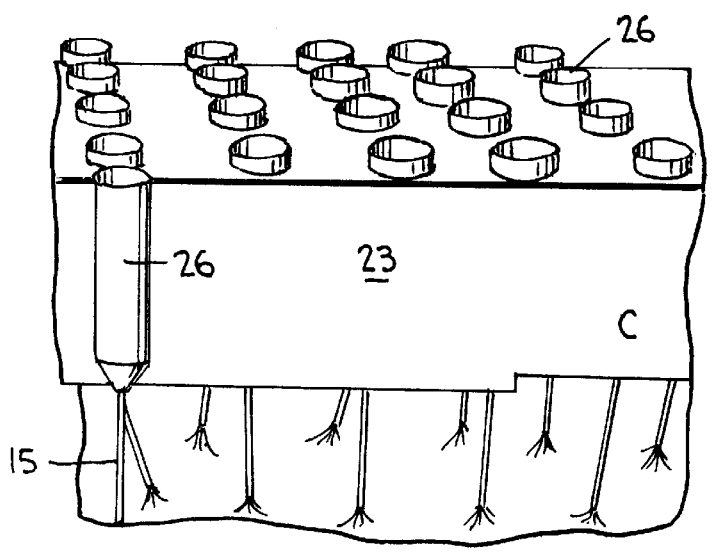
FIG. 5 shows a portion of the embodiment of FIG. 4 with a portion of the bottom tray of the reservoir broken away to show the downwardly-extending wicks from the growth medium containers; also showing a growth medium container with downwardly-extending wick.
Figure 7:
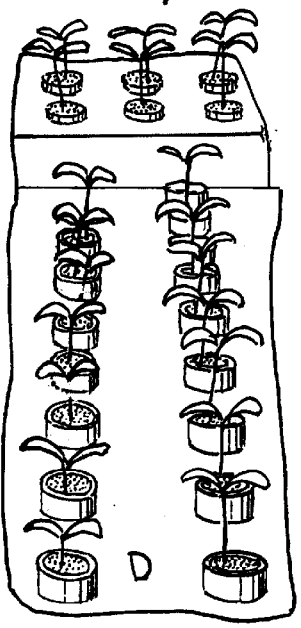
FIG. 7 is a perspective view of a holding rack with growth medium containers showing soybean seedings 7 days after pruning above cotyledons.
Figure 8:
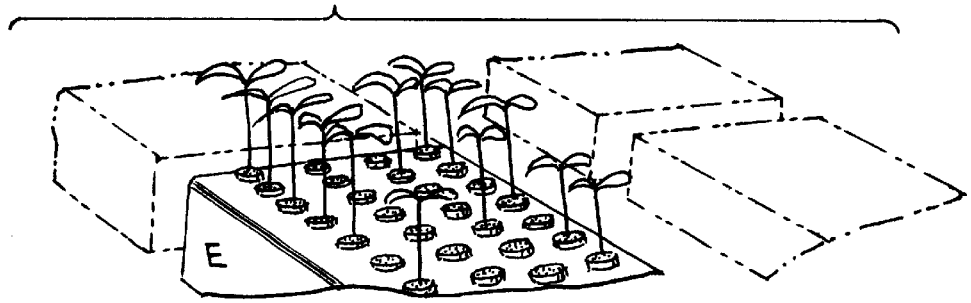
FIG. 8 is a perspective view of an array of holding racks with growth medium containers showing soybean plant growth 33 days after soil infestation.

FIGS. 3–5 depict an embodiment used for water transport, plant growth and bioassay experiments. The enclosed reservoir 20 was made of a white Polyfoam Freeze Safe stock insulated container, (Model #2310-6L, Packers, Wheeling, Ill.). Its exterior dimensions were 62.5×30×20 cm and interior dimensions were 57.5×25×15 cm. The container or reservoir was formed of a lower half or tray 22 and an upper half or holding rack 23. The holding rack 23 was provided with slots or elongated bore holes 24 cut with a 3-cm-diameter hole saw through the top surface. These holes were for container 26 insertion and support. Two hole spacing patterns were used: 1) twenty-seven, 3-cm-diam. slots with staggered centers 7.5 cm apart (not shown); and 2) thirty-six, 3-cm-diam. slots evenly spaced with centers 7.2 cm apart.

Each hole supported one container or grow tube 26 above the water surface in the tray 22 at maximum capacity. The container 20 as shown is, for instance, a disposable sterile polypropylene centrifuge tube having a tapered bottom apex end, 50 ml capacity. The type, shape and dimensions of the containers were not critical. The container may be transparent, opaque, or translucent.

If rack 23 is removed from tray 22, rack 23 may be placed on stand 40 (FIG. 6) so as to elevate the rack to prevent damage to wick inserts 15.

Wick insert 15 were made of, for instance of 0.3-cm-diam. Lehigh nylon rope 16 (Lehigh, Allentown, Pa.), and coated with 0.35-cm-diameter Cole-Flex irradiated polyolefin heat shrink tubing 17 (shrinks 50%) (Manhattan/CDT, Manchester, Conn.). Wick insert 15 was manufactured by threading the nylon rope 16 through shrink tubing 17 and heating the assembly in a 121° C. dry oven for eight minutes. The treated wicking 15, 15 cm in length, was inserted through a 0.5-cm-diam. opening in the center or apex of the bottom of grow tube 26 and pulled through the 0.5-cm-diam. opening. The polycoating was then stripped from a 2-cm length at each end of the nylon rope. Paraffin may be substituted for the shrink wrap tube or sheath as well as other materials capable oil stiffening the wick and which are essentially waterproof. The nylon rope can be replaced with other types of synthetic fibers known to those of ordinary skill in the art. Of course, the roping must be capable of facilitating water transport from the reservoir 20 to a rooting medium present in grow tubes 26.

The wick 15 was inserted within the tube 26 to a height defined for the particular experiment. The remaining length of the wick 15 extended through the center bottom of the tube 26 and into the reservoir. The polypropylene sheath could be sealed to the container at its intersection with the bottom of container 26 with non-toxic water insoluble adhesives. However, in manufacturing the assembly by drilling a hole only slightly larger than the wick diameter and pulling the wick through the hole, frictional sealing was obtained sufficient for purposes of the invention. The lower end portion of the wick could be in direct contact with the bottom of the reservoir 20 or a few cm higher depending on the wick height within the grow tube. Thus, with the reservoir full of water, the wick 15 of a grow tube 26, positioned in slot 24 of rack 23, was in contact with the water present in reservoir 20.

Before filling the reservoir with water, the reservoir was preferably lined with a disposable plastic insert. It held a maximum volume of 9 liters. When the holding rack was set onto the reservoir and the grow tubes placed in the slots, an airspace of about 3 cm remained between the bottoms of the tubes and the water surface in the filled reservoir. For ease in movement, the reservoir was not filled to capacity until the system is situated in a permanent test location. The reservoir was then filled by temporarily removing a grow tube and adding the water through the open slot using a hose or watering can.

Figure 9:
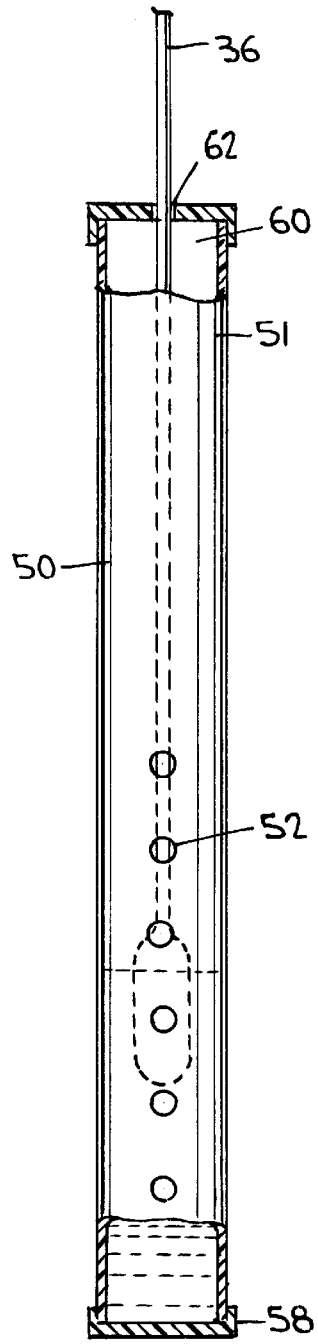
FIGS. 9 and 10 show cooperating elements of a moisture level detector that can be used to determine the level of water in the embodiment of FIG. 3.
Figure 10:
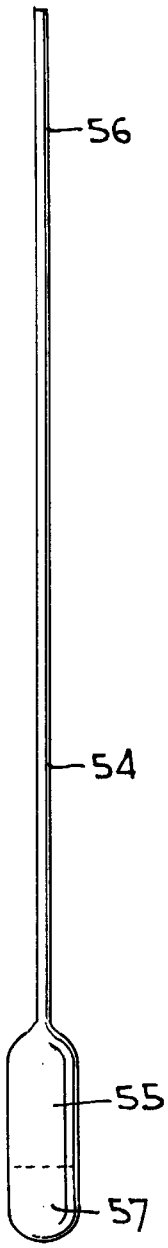

Water uptake was monitored by float meter 50 shown in FIGS. 9 and 10. Float meter 50 included a hollow PVC tubular housing 51 having ascending spaced apart holes 52 for the ingress and egress of water; a float 54 with a bulb end 55 filled with water 57 and air, and an elongated indicator tail 56, so that the entire float was longer than housing 51. The housing included a removable bottom cap 58, a top cap 60 having a centralized opening 62 through which tail 56 passed allowing for the movement of float 54 with tail within the tube 51. The meter 50 was placed through a hole (not shown) in the rack 23 and the bottom cap rested on the base of the reservoir while the tail and an upper portion of the float were seen at the top of the rack. Water within the reservoir entered the meter 50 through holes 52, causing the float 54 to float, thus raising and lowering the tail consistent within the water level. The tail may be either graduated or indexed to reflect the exact water volume or may be color coded to provide a rough estimate of the water level.

Culture model. This was used for the establishment, maintenance, and increase of stock cultures for test inoculum. Modifications from the bioassay model were: i) the holding rack had ten 7-cm-diameter slots. The rack accommodated five slots along the length with centers 12.5 cm apart and two slots per width with centers 15 cm apart; 2) each slot supported one 250 ml plastic beaker with the open top at 7-cm-o.d. tapering to a closed bottom at 5.4-cm-o.d.; 3) the wicking was 0.45-cm-d and coated with 0.5-cm-d shrink tubing. The wick inserted to a height of 6.5 cm within the beaker and extended 11 cm from the bottom of the beaker to the reservoir bottom. The float could also be used in association with this embodiment.

Rooting medium: Greenhouse stock builder's sand was used for cultures and all tests. Sand was steam-sterilized, air-dried, passed through an 850-µm-pore sieve to remove gravel and any extraneous materials, and stored in covered bins. Each batch was analyzed for texture and pH.

Moisture volume percentage (MVP) of the rooting medium. Water uptake, plant growth and *H. glycines* bioassay evaluations were conducted with an initially established soil moisture content that varied according to treatment. Soil moisture treatment levels were established by determining the required ratio of water to dry rooting medium by volume (water volume/dry medium volume ×100=MVP; Brady, 1974). The system was prepared for container insertion prior to moistening of the sand by adding about 360 ml of tap water to the reservoir and seating the holding rack onto the reservoir. As containers were filled with sand, they were immediately placed into the holding rack and wick uptake of water initiated. In water transport and plant growth experiments, dry sand and each grow tube with wick insert were weighed individually prior to setup for calculation of MVP at data collection. The weighed volume of dry sand (50 cm$^3$) was then mixed with the treatment volume of tap water and immediately funneled into the grow tube. In culture and bioassay experiments, the total amount of sand for the entire test was moistened to the desired MVP immediately before the beakers or grow tubes were filled. Moistened sand was added around the central wick with gentle tapping of the beaker or tube at intervals to allow for a uniform settling of the medium. To determine the volume of water held in the wick as opposed to the sand, 35 prepared wicks were weighed individually and then submerged in water prior to use on tubes. To ensure saturation, the wicks were removed each day, free water was blotted away, and weights were determined. This was done for a total of three days for weight stabilization. The average added water weight was 0.6 g. In addition, dry plant weights were determined at the termination of plant growth experiments and averaged. Wick water weights and/or dry plant weight were included as a correction factor when determining the MVP for all experiments.

Water transport: Because subjective observations indicated that water was wicked into a moist and not a dry rooting medium, the effect of sand moisture content on subsequent water transport from the bottom reservoir was tested.

This experiment was conducted for a total of 36 days. The bioassay model with 27 slots in the holding rack was used. Wicks were 7.5 cm high within each grow tube in the rack. Treatments consisted of three MVPs (7.5%, 30% and 50%) with eight replicates. Weighed dry sand (96% sand, 0% silt, 4% clay, pH 8.1) was mixed for even moisture distribution with 3 ml of tap water for each individual grow tube. Eight replicates at 7.5%, 30%, and 50% MVP were prepared by respective addition of 0, 12, and 20 ml tap water to the initial 3-ml-moistened sand. For each treatment, an additional grow tube was prepared and a thermometer was centered in the bottom. After eight days on a laboratory bench (means of 21° C. and 32% RH), the system was placed into a controlled environment growth chamber at 27° C. and maintained at a 12:12 hour light:dark period with cool white fluorescent lamps (100 µwatt/m$^2$/sec). RH varied from 10% to 15% in the growth chambers. All experiments conducted in growth chambers had the same environmental parameters. To monitor the status of MVP over time, visual observations and weights were recorded for each grow tube on days 0, 2, 5, 8, 12, 15, 19, 23, 27, and 36 of the experiment.

Direct seeding and plant growth: Experiments were designed to (i) evaluate the feasibility and performance of direct seeding, (ii) determine the effect of the height of the stripped portion of wick within the grow tube on plant growth and moisture delivery, and (iii) accommodate plant growth to the size of the system by shoot pruning. In one experiment with three treatment replicates the 27-slot rack was used; in a second experiment with four treatment replicates, the 36-slot rack was used. Grow tubes were filled with builder's sand (96% sand, 0% silt, 4% clay; pH 8.1) at a MVP of 30%, based upon results from the moisture percentage experiments. Two wick heights within the grow tubes, 7.5 cm and 5.0 cm, were the main treatments. Tubes were planted with one seed per tube in the direct center at a 2.5 cm depth. Soybean cultivars Essex, Hartwig, Peking, and PI88788 were used. Weights were recorded for each individual grow tube at setup and day 7, 16, 22, and 29 of the experiment to monitor MVP. Plant growth was monitored to determine stage of pruning for control of plant growth. Each system had three randomly placed grow tubes with thermometers inserted in the direct center to half depth. The systems were maintained in separate growth chambers. Fresh and dry root weights for test plants were determined at the end of each experiment.

Foliar discoloration was observed on all seedlings in the plant growth experiments with the previously unused wicking treatment. To clarify probable cause, the experiments were repeated with previously used wicking only.

Stock cultures: An *H. glycines* isolate, previously classified as race 3, was obtained from stock greenhouse cultures initiated by 10 successive single female transfers and maintained on Essex soybean (Anand, pers. comm.). This isolate was then increased and maintained in the culture model on Essex to provide inoculum for the bioassay experiments. Because of previously observed foliar browning and precipitate formation on the sand surface when plants were grown in tubes with new wicking, the model was preconditioned by running it for three weeks before plants were included. The sand was discarded, and beakers were rinsed with tap water and autoclaved. Immediately before seeding, each of the beakers in a model was filled with 240 cm$^3$ of builder's sand moistened to 21% MVP (i.e., 500 ml of tap water per 2,400 ml sand for 10 beakers). Three seeds of Essex were planted 2.5 cm deep in a triangular pattern about 1.5 cm from the wall of the beaker. Seven days after seeding, seedlings were pruned just above the cotyledons. Cultures were initiated with 20 gravid white females from a tap water-filled vial, placed in deep watch glasses with 2 ml of tap water, and broken open with forceps to release eggs. A 2.5 cm depression was made between each two seedlings and the contents of one watch glass were washed into each depression and covered. Prunings of re-growth were done as needed during the life of the culture. Culture transfer was done every 30–33 days with gravid white females collected as in bioassay inoculum preparation.

General bioassay: Wick heights were adjusted to 5.0 cm within the grow tubes, as plant growth experiments demonstrated a greater moisture uptake than water transport experiments. MVP of the builder's sand was established at 24%, based on the plant growth study results. Individual grow tubes were randomly monitored during testing for moisture level as well as demonstration of favorable development of *H. cajani* at moisture levels 24%, based upon the moisture results in the previous trials in this on the plant growth study results. Individual grow tubes were randomly monitored during testing for moisture level. Seeding was done as in plant growth experiments. Test plants were pruned just above the cotyledons on the seventh day after seeding. Gravid white females were routinely obtained from 33-dayold stock cultures and the eggs were released for use as inoculum immediately prior to soil infestation.

For inoculum collection, a culture beaker was removed from the system, submerged on its side in tepid tap water, and allowed to saturate for about 40 seconds. The seedlings with the root ball were pulled free, and excess sand was carefully washed from the root mass. Females were massaged from the roots under a stream of tap water onto nested 850-μm- and 149-μm-pore sieves. Washings remaining in the bucket were roiled and poured through the sieves as above to collect additional females. The females were crushed on the 149-μm-pore sieve with a rubber stopper and rinsed repeatedly with tap water from a wash bottle. The eggs were collected on a 25-μm-pore sieve. Eggs were added to the grow tubes within the growth chamber seven days after seeding. A 1-ml suspension of eggs was pipetted to a depth of 2.5 cm at about 0.5 cm from the base of the test seedling.

Upon termination of the experiments, females were extracted from the roots and the sand as in inoculum preparation and collected on filter paper and counted. Fresh root weights were determined for test plants at the end of the experiments.

Inoculum performance and female development: Evaluations of inoculum density and rate of female development within the system were performed in two different sources of builder's sand to examine the effect of sand source on bioassay response. The two sand batches were 98% sand, 1% silt, 1% clay, pH 6.2, and 97% sand, 1% silt, 2% clay, pH 7.1. Essex was the host cultivar and each seedling was inoculated with 1,000 eggs. Soybean root systems were harvested at 21, 27, and 33 days after inoculation (DAI) with 10 replications at each harvest.

Cultivar and inoculum level response: An experiment was conducted to evaluate growth response of additional soybean cultivars, $H.$ $glycines$ inoculum performance and female maturation within the system. Soil particle analysis was 98% sand, 1% silt, 1% clay; pH 6.2. Soybean cultivars tested were Essex, Hartwig, and Lee. Inoculum levels were 500 eggs or 1,000 eggs per tube, and treatments were replicated four times. Soybean roots were harvested 27 DAI.

Contamination evaluation: Because the system uses a common reservoir for all wick transport of water, a test was conducted to address the possibility of contamination within the system. Sand used was as in cultivar and inoculum level testing. Essex was the host, and treatments were the uninfested control and infestation with 1,000 eggs per tube. Each treatment was replicated 15 times. Soybean roots were harvested 30 DAI. At test termination, water remaining in the reservoir was passed through a 25-μm-pore sieve as an additional check for nematode contamination.

General procedures: No additional moisture was added other than the water supplied by wick transport from the original fill of the system reservoir. As a precautionary measure, tap water-washed grow tubes and beakers (with wick inserts) were autoclaved at 121° C. for 30 minutes after each test run. Breeder-selected seed from uniform stock was used in all evaluations of plant growth. No plant nutrients were added. For the $H.$ $glycines$ evaluations, extracted females were divided by the initial inoculum level to determine relative female development after inoculation. All experiments were repeated once. With the exception of the direct seeding and plant growth experiments, results of the two runs of each test were similar (P=0.05) and data were combined for analysis. Experimental treatments and replications were completely randomized. Data were examined by analysis of variance, followed by mean separation with least significant differences (LSD) using MSTAT-C software (Michigan State University, East Lansing, Mich.).

Results

Water transport: There was no significant change in moisture level in the 7.5% and 30% MVP soil moisture treatments for the duration of the 36-day experiment (P≦0.01). The 50% MVP treatment dropped to 41% MVP by day two and remained in that range for the remainder of the test. All replicates of the 30% MVP and 50% MVP treatments appeared moist throughout their soil profile during the test. All replicates for the 7.5% treatment were dry to a depth of about 1.0–1.5 cm at the end of the test. At all three moisture levels, soil temperatures averaged 2° C. above air temperature.

Direct seeding and plant growth: Both rack patterns of the bioassay system provided similar plant growth data. By the third day after planting 100% of the seed had germinated. From this point throughout testing, progressive root growth could be visualized at the lateral surface of the grow tube. Subsequent seedling growth was uniform. One foliar pruning was done above the unifoliate node at the unfolding of the first trifoliate leaf. On the ninth day of testing, browning of the leaf tips began to appear on all test plants in grow tubes with new wicking. Subsequent growth of these plants had no evidence of browning, but a white precipitate was observed on the surface of the sand in the grow tubes. Differences in mean fresh shoot weights for the used and new wicking, (1.1 g and 0.9 g, respectively) were not significant. Dry shoot weights averaged 0.2 g. Cultivars were similar in their response to wicking source in both fresh shoot and root weights. However, within each cultivar, the average fresh root weight of 1.7 g for the used wicking treatment was much greater than the 0.5 g fresh root weight for the new wicking (P≦0.01). Root systems were otherwise asymptomatic. Height of the uncovered portion of the wicking at 5.0 cm within the grow tube resulted in higher final MVP's then the 7.5 cm height (P≦0.01). Moisture levels in the 27-slot pattern were 31% and 23% for the 5.0 cm and 7.5 cm wick heights, respectively. In the 36-slot pattern, moisture levels were 35% for the 5.0-cm wick height and 25% for the 7.5-cm wick height. The sand in all grow tubes was dry from the surface to an approximate 0.5 cm depth from the sixth day of testing. The remainder of the soil profile was moist at the termination of the testing. Differences in sand and ambient temperatures were negligible.

The repeat evaluation, where only previously used wicking was tested, had no browning of the test plant foliage and no white deposit was observed on the sand surface. Average fresh and dry root weights were 1.1 g and 0.1 g, respectively. Other than the root performance, results were similar to the first run.

Inoculum performance and female development: The greatest numbers of females were extracted from test plants grown in the builder's sand analysis with pH 7.1 at 27 DAI and 33 DAI. (Table 1). In both tests, more females were extracted at 33 DAI and 27 DAI than at 21 DAI (P≦0.01). Mean fresh root weights at test termination were similar for all harvest dates within a test (P≦0.01). However, average fresh root weights at pH 7.1 were 50% less than those tested at pH 6.2 (Table 1). Root systems in general appeared to be compact and dense with the top pruning done just above the cotyledons. MVP of the builder's sand at test termination was about 28%.

TABLE 1

Effect of builder's sand composition on development of females of *Heterodera glycines* and root weights of *Glycine max* 'Essex' when evaluated in bioassays systems maintained in controlled environment chambers.

|  | Extracted females weight (g) | % Female development | Root fresh weight (g) |
|---|---|---|---|
| | 98% sand; 1% silt; 1% clay; pH 6.2 | | |
| 21 | 199 ± 33[b] | 20 ± 3[b] | 1.0 ± 0.2[b] |
| 27 | 311 ± 67[a] | 31.0 ± 7[a] | 1.0 ± 0.1[b] |
| 33 | 305 ± 53[a] | 31 ± 5[a] | 1.8 ± 0.2[a] |
| | 97% sand; 1% silt; 2% clay; pH 7.1 | | |
| 21 | 243 ± 44[b] | 24 ± 4[b] | 0.5 ± 0.05[a] |
| 27 | 372 ± 36[a] | 37 ± 4[a] | 0.6 ± 0.11[a] |
| 33 | 402 ± 35[a] | 40 ± 4[a] | 0.4 ± 0.09[b] |

Values are means ± SE of 20 replicates from two trials. Means in the same column followed by the same letter are not significantly different according to an LSD test ($P \leq 0.01$).
[a]Days after inoculation.
[b]Extracted females divided by inoculum level of 1,000 eggs per root system. Inoculum was derived from stock cultures 33 days after inoculation.

Cultivar and inoculum level response: Root growth was similar among cultivars (mean fresh root weight 0.86 g; (P=0.05). Mean numbers of females extracted from Essex and Lie test plants were more than 30% of the initial inoculum for both inoculum levels. Mature females were not observed on or extracted from Hartwig roots. MVP at test termination remained within the range initially established.

Contamination evaluation: The inoculated treatment in both tests was successful with a mean production of 385 and 366 mature females for the first and second runs, respectively. No females were extracted from the uninoculated treatment. Mean fresh root weights were 0.67 g for the inoculated plants and 0.85 g for the uninoculated plants. No *H. glycines* juveniles were detected in the sievings from the water remaining in the reservoirs at the termination of testing. Soil moisture replacement was consistent with previous results.

Discussion

Results of this study indicated that this system is highly useful for bioassay of *H. glycines*. The two primary attributes are soil moisture control and direct seeding of soybean for *H. glycines* bioassay, which provide control possibilities for two additional variables during bioassay evaluations.

The initial water transport test was performed with builder's sand alone. Moisture levels were arbitrarily chosen to observe the potential of the hydraulic conductivity within the system once the particular hydraulic gradient was established. Moisture replacement over time was expected. However, the replacement and maintenance of the three distinct soil moisture levels for the 36-day period indicated a capability for a more precise and long term application. In plant growth tests, increasing the height of the exposed wick within the grow tube resulted in lower soil moisture levels than at the lower height. Therefore, wick height as well as the initial soil moisture content can be manipulated to maintain desired levels of soil moisture.

Previous testing demonstrated the greatest reproduction by *H. glycines* in soil types with the highest sand content. Builder's sand was a highly effective rooting medium for bioassay of *H. glycines* in this system. When the sand was pre-μmoistened at the desired level, containers were easily and rapidly filled. Direct seeding was quickly accomplished. Because root systems were easily rinsed free of sand at harvest, females were readily observed on the root surface and relatively clean females were extracted for enumeration.

Numerous investigations have focused upon the effects of soil moisture on various aspects of both nematode and host. With saturated or wet soil moisture conditions, the resulting low oxygen levels, carbon dioxide accumulation, and/or toxin increase were associated with decreases in nematode survival, root invasion and development rate. These effects were detrimental to plant growth as well. Conversely, adverse low moisture levels reduced nematode motility and survival rates. The effects of soil moisture on penetration, development, and reproduction of Heterodera cajani on pigeonpea (Cajanus cajan) in both growth chamber and greenhouse studies have been demonstrated. Moisture treatments at 24% and 32% had the highest reproductive rates. In the invention, trials were conducted with initially established moisture levels of both 24% and 30% and excellent reproduction occurred at each level. Development of mature females of *H. glycines* initial inoculum averaged more than 30% on susceptible soybean cultivars for these experiments. Previously reported race tests, using larger pots and higher inoculum levels, often had mature female extraction rates at less than 5% of the initial inoculum for Essex and Lee soybean.

This variation of the invention demonstrates the moisture replacement system as an environment conducive to development of *H. glycines* females. The broader application of this method enhances future experimentation involving the effects of moisture stress on the interaction of *H. glycines* with soybean. The role of additional edaphic factors will also be more precisely examined with the incorporation of moisture control. Greater *H. glycines* production has been reported at pH 6.5 and 7.5 than at 5.5. In the present bioassay system using Essex, greater female development and a lower fresh root weight occurred at pH 7.1 than at pH 6.2.

The air space between the bottom of the grow tubes and the surface of the reservoir was designed to preclude the possibility of an exchange between the grow tube contents and the reservoir water. The contamination trials also demonstrated that second-stage juveniles (J2) did not enter the wicking and did not move against the hydraulic gradient into the reservoir.

Many bioassay evaluations often involve seedling transplant, wherein the occurrence or extent of root injury is an undetermined variable possibly altering test results. In one study, fewer *H. glycines* J2 entered the roots and fewer females developed in plants when root tips were removed at or before the time of inoculation. In tests on post-inoculation management, the greatest number of females developed on plants that were not transplanted after inoculation. Therefore, one intent in system design was to incorporate direct seeding in order to eliminate effects of root injury on female development. The use of seed harvested within the test year resulted in 100% seed germination with uniformity in emergence and subsequent seedling growth.

Several soybean cultivars were evaluated in this system. Shoot pruning above the cotyledons was practiced in order to maintain manageable shoot and root growth for the size of the system. In addition, the resultant compact root growth allowed ready observation of females with a hand lens. The inoculum was delivered to a depth of 2.5 cm. and examination at harvest revealed that most of the developed females were within the upper third of the root systems. This concentration of females provides expediency in screening for SCN resistance. Pot size had no significant effect on female numbers; therefore, there was no advantage to use larger pots that take more space. In other studies of shoot pruning, host-parasite compatibility was unaffected by shoot pruning as done in these experiments.

The system provided efficient use of resources throughout the protocol for experimentation. The lightweight, compact polyfoam units are easily handled by operators and readily transported between locations. Movement is safely accomplished when the reservoir contains less than two liters of water. When top growth is minimized by pruning, the 36-slot rack spacing pattern gives the most efficient use of space. The transparency of the growing containers allows good visibility of both vertical moisture distribution and progress of root growth during bioassay.

No known finished container of similar construction and principle to the container component of this system is in existence. The wick insert seals and retains materials within the container. Also, the wicking provides distance transport of water with no direct contact between the container bottom and reservoir contents. Therefore, unlike containers having bottom drainage openings, placement of multiple units exposed to various agents(infestation, fertile, growth hormones, herbicides) into a common reservoir is feasible without fear of contaminating the water supply.

Quantities of sand for the rooting medium and inoculum for testing are minimal in comparison to standard pot testing. Therefore, the amount of labor required for all operations is greatly reduced. Quantities of nematode-contaminated roots and soil that must be sanitized subsequent to evaluation and prior to disposal are also substantially minimized. This fact, coupled with the absolute containment of inoculum within the experimental unit, offers an environmentally sound alternative to bioassay procedures requiring materials on a larger scale.

A few precautions are essential for successful utilization of this system. Because soil moisture replacement is based on the initial establishment of the hydraulic gradient, the moistened rooting medium must be placed around the wick and to the desired height with intermittent firm but gentle tapping of the container. This vibration will yield a continuous and friable column of media. Moisture replacement in columns of media that are either compacted or interrupted by gaps and large cracks was observed to be ineffective. This was evident in the observable drying of the medium within the transparent containers. The material used for wicking in this study should be preconditioned for at least three weeks in advance of experiments due to the adverse plant response and formation of an unanalyzed precipitate. Any alternative wicking should have preliminary trials. Rapid air movement that occurs in close contact with the sand surface in the containers, as can result with blowers in some growth chambers, results in undesirable surface moisture loss. As the soybean hypocotyl emerges and pushes through the soil surface, a layer of dry sand is moved up as well. The surface can be lightly moistened to correct this, but if heavy air movement continues the drying recurs and intensifies with time.

The invention has been evaluated in controlled environment chambers, greenhouse and laboratory environments. Manipulation of one or more edaphic factors I the tree locations in conjunction with the system, has circumvented seasonal testing restrictions. Adjustments require minimal input and materials are readily available. Trials involving resistance screening and race determinations have been decisive as SCN female development. Initial testing of Meloidogyne incognota in culture and bioassay on 'Rutgers' tomato indicates a positive response.

In direct seeding, using breeder selected seed for a number of soybean cultivars, the system of the invention provided 100% germination.

B. Second Variation of Growth Medium Moisture Replacement System

A wick watering system was developed to address the situation of widely fluctuating watering practices in watering potted plants. The watering system is intended to provide unattended water replacement at a regulated or determined rate over an extended period of time.

In numerous trial manipulations to determine specifications for the production of a working water system, it became quite clear to the inventors of a need for the subject invention.

Experimentation which led to the invention began with a jute rope submerged in buckets of water and leading into pots containing plant materials growing in sand within plant growth chambers. This setup functioned as a water delivery system, but observed effects of gravity needed to be controlled in order to provide a slower, more even flow of water to the potted medium. With uncontrolled gravitational forces, water continuously moved into the growing media volume saturating the media (sand), which resulted in water flowing freely from the drainage holes at the pot bottoms. The medium was saturated, reservoirs emptied quickly, and the exposed wick dried and ceased in the transport of water to the intended target. The wick delivery theory was valid in providing moisture, but the system failed without control of flow.

Preliminary trials and subsequent adaptations led to observations which provided needed input as to factors to address in order to produce the desirable effect-replacement of moisture over time.

The following factors note from preliminary studies and trials and recognized as primary in development of a working wick watering system are: 1) stability of the reservoir when in place; 2) control of rate of wick transport of water from reservoir to target medium; and 3) further define dimensions of delivery openings (apertures) in the lower support/delivery tube for exit of water to the medium from the reservoir.

The wick watering system is a product of the theory that through manipulation of design, once constructed and supplied with water, the system can operate on the nature and properties of water, gravity and soil or comparative media without use of external power sources.

Studies involved separate but related experiments. Experimental layouts were completely randomized and analysis of variance (ANOVA) was used to test for significance.

Part A of the first experiment was conducted in a Model E-54B Percival growth chamber with a 13 hour photoperiod of 2,000 fc, continuous temperature of 21.1° C. and an average relative humidity of 59%. The experimental design consisted of wick watering systems in each of two media with four replications.

A wick watering system, shown in FIG. 11, and seven were identical ones, were constructed and consisted of the following:

1) a reservoir 70 (Fleaker lab ware #146706, 500 ml. calibrated, polypropylene) with a cork stopper 71 shown in phantom for the top end to prevent evaporation and/or spillage of contents; a support/delivery tube 72 (Kimble disposable pipette #P095, 10 ml in $\frac{1}{10}$ increments, 1-cm-od, 0.8-cm-id) located in the center of the Fleaker and shortened in length to extend from the 450 ml mark at the top of the reservoir (3.5 cm from the top opening of the Fleaker) through a 1-cm-d opening 73 in the center bottom of reservoir 70 (where the tube was sealed in place on all contact surfaces with DURO extra strength, quick set epoxy to prevent leakage around the tube) to 8.5 cm past the bottom end of the reservoir. On opposing sides of the lower support/delivery tube and beginning 1.1 cm from the bottom of the reservoir to cover an area of 2.4 cm are drilled four, 0.3-cm-d apertures 74 (exit holes) 0.4 cm apart for contact of wick with media (not shown) and thereby delivery of water. 3.7 cm of the terminal end 75 of the tube remains tapered as manufactured for ease of insertion into the media (e.g., sand or loam). The existing terminal tube opening 76 is sealed water tight with epoxy; and wicking 80 (0.9-cm-d Nylon Rope, Lehigh, chosen for excellent resistance to abrasion, rot and mildew) which starts directly at the inside bottom of the reservoir, extends upward and curves at an 180 degree angle (reflexes) into the opened top of the support/delivery tube 72 where it is continuous through the tube to 1.0 cm past the lowermost exit aperture. All wicking, with the exception of 1.5 cm at the start end inside the reservoir and 3.0 cm at the area of exit aperture installation, is polycoated 81 (121° C. oven for 10 minutes) with 0.9 cm COLE-FLEX Irradiated Polyolefin heat shrink tubing (shrinks 50%). Above coating treatment reduced wicking to 0.7-cm-d. The curve at the 180 degree angle was hand molded as wicking cooled down from the oven treatment. A band (approximately 2.5 cm in length) of shrink tubing is preferably secured around the coated wick and support tube 3.7 cm from the uppermost end of the support tube to maintain the 180 degree angle at the wick reflex and also to ensure contact of the exposed wick end with the reservoir floor throughout the studies.

All test components were individually weighted prior to setup for data computation and calculation of moisture volume percentage (1). Oven dry weights (100C) were obtained for 1400 cc volumes of each medium. Dry weights were 2229.1 grams for builder's sand and 186.9 grams for the Farfard Mix #3. Pea gravel (246.6 grams) was added to the bottom of test pots to be filled with builder's sand (to prevent leakage of this media type from the drainage holes), the level of which was just at the top of the side drainage holes. 15-cm-d standard green plastic pots were filled with 1400 cc of either builder's sand or Farfard Mix #3 (a potting mix commercially available for foliage plants, growing on and hanging baskets). Pots were bottom watered in trays with tap water until no further uptake of water by the media was visible. The pots were then removed from the trays and left standing to stabilize (until no excess water could be seen moving out from the pot drainage holes), at which point moisture volume percentages were determined. In preliminary trials, overhead hand watering resulted in variable moisture content with the Farfard Mix #3. This in turn led to rapid emptying of reservoirs into the potting medium. In order to reduce initial variability in soil moisture for evaluation of the wick watering system, the above method of bottom watering prior to system insertion was utilized. Preliminary testing also indicated that insertion of the system into pre watered media should be recommended in order to maximize the value of the system as to replacement of moisture over time.

Means for initial moisture volume percentages were not significantly different (P=0.0007) with levels of 37% for the builder's sand and 39% for the Farfard Mix #3. Each pot then had a wick watering system inserted at the center top of the medium with the reservoir seated flat on the medium surface. The reservoir was filled to 400 ml. with tap water, stoppered with a cork and the units were immediately placed into the growth chamber. Treatments in all experiments with wick watering systems were run to the depletion of the initial 400 ml volume of water added to the reservoir. No additional water was added to the reservoir or in any other manner.

Initially done on a daily basis (q.d.X4), to ensure that the wick watering systems were functioning, and then at greater intervals (g. 3–4 days) to limit disturbance to the test environment, measurements were taken on overall unit weights (pot and wick watering systems intact), water levels remaining in reservoirs and observations on the moisture condition of the media surfaces were noted for all experimental units until the first reservoir was entirely emptied of water content. Measurements were then taken of each experimental unit on the day of individual reservoir water depletion for determination of mean days run and concurrent media moisture content. In addition to unit weights for moisture volume percentage determination, a 2.5-cm-d soil probe was inserted through the top center of the medium surface to the medium bottom to determine depth of moisture and the pot contents were then inspected for horizontal moisture distribution. Part A of this experiment was considered terminated when the last reservoir was depleted of water. At that time, for Part B of this experiment, all pots were allowed to dry down to dry weight and removed from the growth chamber environment. Pots were bottom watered as initially described and replaced in the growth chamber from May 24, 1995 to May 8, 1995 with all conditions the same as in Part A with the single exception that the wick watering system was not inserted. Mean moisture volume percentages after rehydrating were 33% for the builder's sand and 46% for the Farfard Mix #3.

Experiment two was conducted as in experiment one Part A substituting the environmental conditions by placement in a household setting with room temperature and Relative Humidity readings taken at 6 AM and 8 PM daily.

One 22.5 cm Parlor Palm, Chamaedorea elegans "Neanthe Bella," a commercially available foliage plant, was transplanted, into each of eight 15-cm-d standard plastic pots filled with 1400 cc of Farfard Mix #3 and grown on to the start of experiment two. Initial moisture volume percentages were at a mean of 52% for both treatments. Treatments were plus or minus (no additional water supplied by any means) the wick watering systems from experiment one with four replications. Plants in experimental units without wick watering systems were observed for symptoms of water stress and time to wilting point.

Results

Experiment One; Growth Chamber Study, Part A

Figure 12:
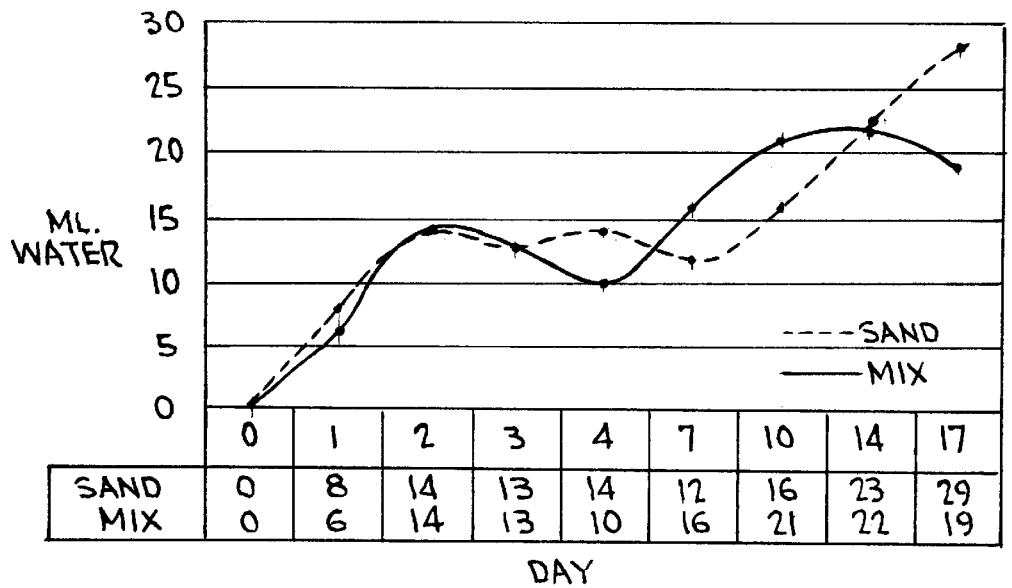
FIG. 12 shows mean daily water flow for sand and mix treatments using the apparatus as shown in FIG. 11 in Experiment One, Part A, in the Growth Chamber.
Figure 13:
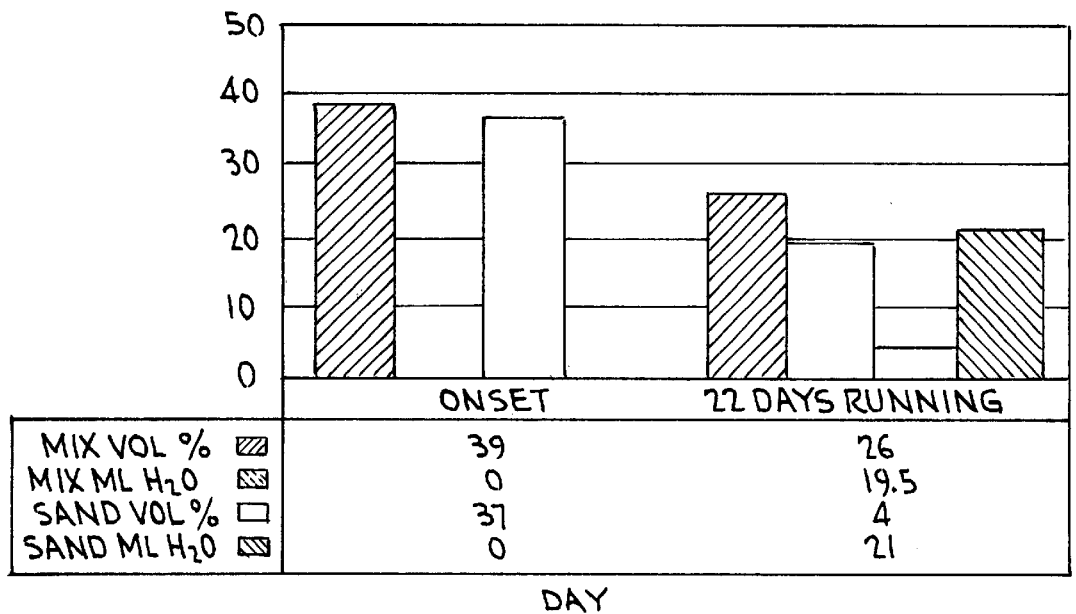
FIG. 13 shows moisture volume percentage and daily ml $H_2O$ use at the onset and for total days running for mix vs. sand in Part A of the Growth Chamber study.

Wick watering systems for all 8 experimental units were determined to be functioning by the second day as evidenced by declining water levels in all reservoirs with a mean of 14 ml exiting reservoirs for both media. Use of reservoir water by both media continued at similar rates until day 7 for the Farfard Mix and day 10 for the builder's sand where water usage increased until the depletion of reservoir contents (FIG. 12). Reservoirs for the wick watering systems were emptied of their 400 ml water content entirely for both media and all replications with a mean of 21.75 and 22.25 total days running for sand and Farfard Mix, respectively. Differences in moisture volume percentages were highly significant (P-0.005) between the media with sand at 4% and the Farfard Mix at 26% for total days running (FIG. 13). The least days run for an individual wick watering system was 17 days in sand with a 12% moisture volume percentage and the maximum days run for an individual system was 25 days in Farfard mix with a 30% moisture volume percentage. Watering systems were examined for differences in construction which might account for differences in days running but no obvious differences were detected.

During the experimental run, moisture volume percentage for the Farfard Mix #3 contained a slow but steady decline until day 7 when the reservoir water usage began to increase. At this point, the moisture volume percentage appeared to reach a maintenance level to reservoir depletion (FIG. 14). For the sand, moisture volume parentage showed a more rapid and steady decline, which continued to reservoir depletion despite the steady increase in reservoir water use evident by day 10 (FIG. 15). Differences in end of treatment (at the emptying of the first reservoir) moisture volume percentages were highly significant (P 0.00001) between the media with sand at 6% and the Farfard Mix #3 at 28%.

By day 6, media observable at the pot surfaces were becoming dry in appearance and by day 13 the observable surface layers of all pots appeared dry. Vertical moisture distribution at the time of reservoir depletion was noted for each unit by removal of a 2.5 cm center core from the medium surface to the medium at the pot bottom. Moisture present in both media types appeared to be evenly distributed from 1–2 cm of the top surface to the pot bottom with no detectable layering of moisture.

Experiment One: Growth Chamber Study, Part B

Figure 16:
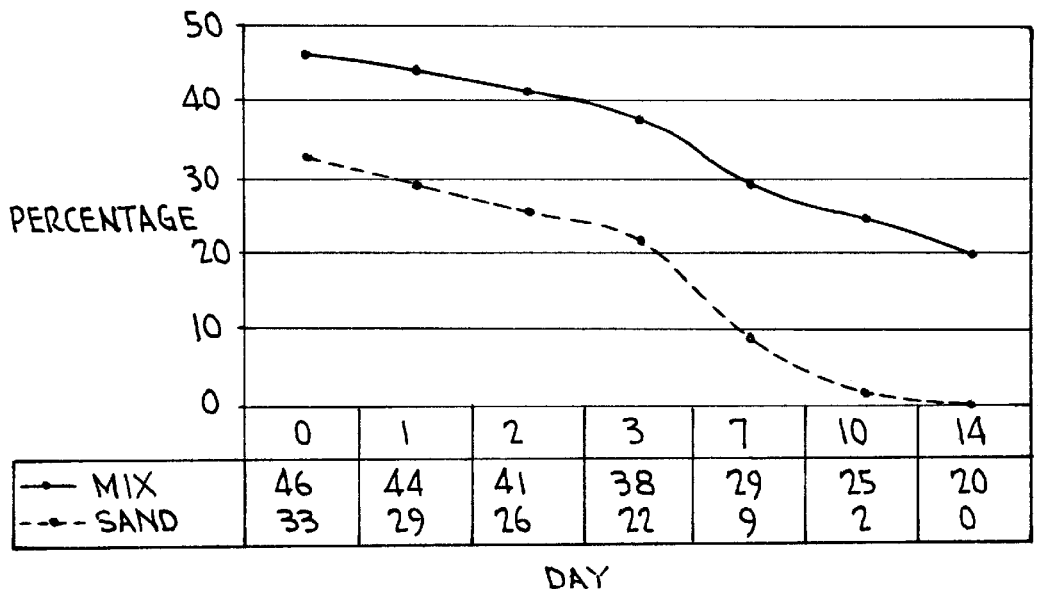
FIG. 16 shows mean moisture volume percentages for sand and mix experimental units rehydrated and replaced into the Growth Chamber without water supplement for Part B of Experiment One.

Experimental units from Part A minus the wick watering systems and replaced into the growth chamber environment after rehydration by bottom watering had initial moisture volume percentages of 46% for the Farfard Mix #3 and 33% for the builder's sand. Moisture volume percentages for both media began to decline from day one of the replacement and continued a steady decline to the termination of the experiment on the 14th day. At termination, moisture volume percentages were 20% for the Farfard Mix#3 and 0% for the builder's sand (FIG. 16).

Experiment Two: Household Environment/Foliage Plant

Room temperatures averaged 23° C. with a high of 26° C. and a low of 18° C. for 6 AM readings. Average room temperatures were 25° C. for 8 PM readings with a high of 27° C. and a low of 19° C. Relative humidity averaged 52% and 50% for 6 AM and 8 PM recordings, respectively.

Reservoirs for all four replications within the wick watering system treatment were showing declining water levels by day four with a mean water usage of approximately 33 ml. Use of reservoir water continued to the point of depletion at a rate of approximately 20 ml/day for all four replications, the least days run for an individual system at 16 days and the maximum days run at 27 days with a mean of 20 days. Individual wick watering systems were again examined for differences in construction accountable for the variability among replications in total days running but none were detectable.

Figure 17:
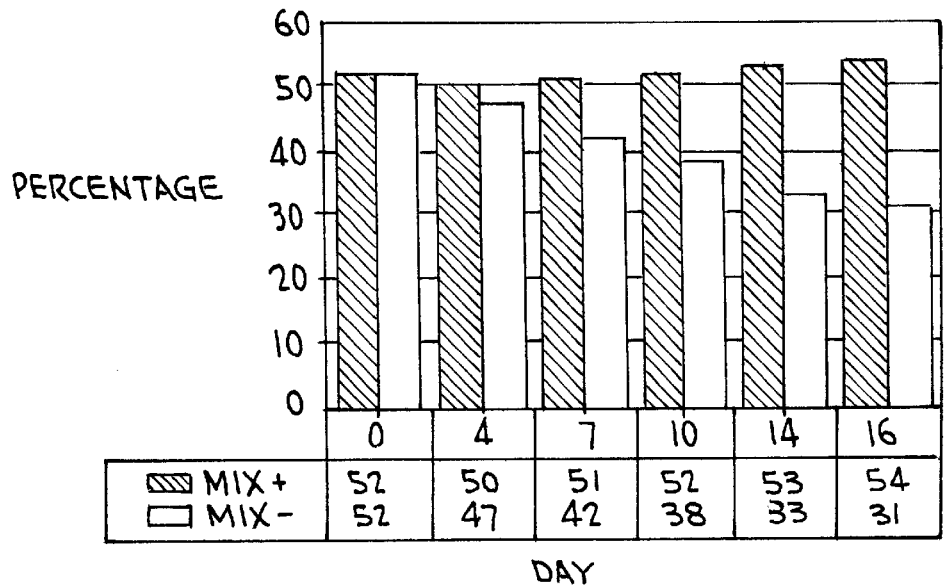
FIG. 17 shows mean moisture volume percentage for Mix with (+) and without (−) wick watering systems in the Household Environment study.

Moisture volume percentage for the wick watering system treatment (plant and mix) remained at a mean of 50% or above throughout the application of the treatment. Control units (no water added) decreased in moisture volume percentage from day one to the termination of recordings. End of treatment moisture volume percentage for the wick watering systems was 54% which was significantly higher (P=0.001) than that of 31% for the control (FIG. 17). By day 16 of the experiment, plants in the control appear to have a darkening and cupping of foliage. By day 18, wilting was observed on some of the foliage in all control replications with a mean moisture volume percentage of 28%. Mean moisture volume parentage for the total days running in the wick watering system treatment was 54%. Mean fresh plant weights calculated at the termination of the experiment add a −1% correction factor to moisture volume percentages reported for experiment two when considering mix moisture exclusively.

By day 8, media surfaces for the control units were drying in appearance. Media surfaces in all replications for the wick watering system treatment remained moist in appearance for the duration of the experiment, and the entire mix appeared to have an even moisture distribution both vertically and horizontally upon examination of mix volumes at the termination of the experiment.

All eight wick watering systems utilized in these experiments were constructed with precise measurement. Differences between replications in number of total running days in both Part A of the growth chamber study and the household environment appear as noted by observation to be the result of location effect on the individual units. In both cases, systems with the shortest days run were located closest to air vents (in the growth chamber site) or people traffic and opening doors (household situation).

All system components satisfied their constructional purpose. The reservoir served as such and was maintained in a stable position during movement of units for data collection as was intended by the centering position of the rigid support tube and the extension of this tube 8.5 cm into the media volume to serve as an anchor. Shrink wrapping of the wicking maintained the wick integrity throughout both experiments. The exposed wick portion at the bottom of the reservoir remained in contact with the reservoir floor via aide of the shrink wrap band splinting the wick to the support tube as evidenced by the complete emptying of all reservoirs in the experiments.

In preliminary trials, insertion of a short wick component directly into the bottom of the reservoir allowed for full force of gravity (which in some situations may be desirable) and resulted in constant flow of water from the reservoir to the target media resembling saturated flow (1). This experimental system design, with the extended length and reflexed positioning of the wicking, combined with limited wick exposure by shrink wrapping, appeared to decrease the force of gravitational pull in water transport and thereby also relies upon capillarity and the soil matrix forces of suction and tension (1) for the regulation of the use of reservoir contents. In addition to wick regulation of water movement, the size of the exit apertures in the lower support tube appear to serve as a vital component in regulation of water delivery. In preliminary trials, single or double larger (1.25 cm) aperture(s) allowed a greater wick to medium surface contact and a faster rate of flow which resulted in saturating the media immediately surrounding the support tube with resultant runoff from the pot drainage holes. By use of eight, 0.3-cm-d apertures within the same surface area, water was more evenly distributed to the medium and at a surface contact and rate that appears to have allowed media matrix forces (1,4) to operate with the watering system (FIGS. 14, 15).

Epoxy sealing the support tube into the bottom reservoir opening to maintain a closed system worked well for short term use but tends to weaken and therefore a more durable method of water tight construction would be preferable. Heat or melt fusion of the reservoir and rigid polytube would be one alternative practice to solve this problem. The sealant or method for sealing is not critical.

Moisture Replacement

Slow or regulated replacement of moisture over a period of time is evidenced in both the Growth Chamber study and in the household environment by the data for total days running and measurements of moisture volume percentages. Moisture volume percentages for the Farfard Mix #3 with wick watering systems fall well within or around the 30 to 50% range for acceptable moisture content viewed as necessary for favorable plant growth (3,4). Additionally, in all treatments supplied with wick watering systems, moisture appeared to be evenly distributed throughout the soil profile at the termination of the experiments. Even in sand, which has a low water holding capacity (1), the system was capable of supplying moisture (FIG. 15) which would indicate that with modification of components, an adequate supply of moisture could be delivered to soil types that are considered to be difficult to maintain at an adequate moisture level.

Part B of Experiment One had been conducted for comparative purposes. As the Farfard Mix #3 is composed of a variety of material and the mix will therefore vary to a degree, the identical units and volumes were replaced into the growth chamber after rehydration to observe decline in moisture volume percentage over time in the absence of the wick watering system. Part B was terminated at 14 days when moisture volume percentages were 0% for sand and 20% for the Farfard Mix #3.

This product can operate on the nature and properties of water, gravity and soil or comparative media without use of external power sources. Both the Growth Chamber and Household Environment studies, mean total days running of 22 and 20, respectively, for the Farfard Mix #3 with wick watering systems inserted, strongly support the proposal for use of this product as a tool with both labor and water conservation potential. In addition, the capability of maintaining plant materials in a state that is at or near adequate moisture availability during adverse environmental situations should be more clear when considering the percent of the initial moisture volume percentage remaining over time in the media with and without wick watering systems in Experiment One, Parts A and B (FIG. 18) and the Household Environment study (FIG. 19). Refinements of construction for ease in manufacture and cost effectiveness in mass production should be readily identifiable. Simple modifications in design of reservoir and/or delivery tube apertures would lead to adaptation of the product for various target uses as outlined in the accompanying invention disclosure.

The examples, drawings, and description above are in no way meant to limit the invention. One of ordinary skill in the art will be able to readily construct obvious variations. The invention is only limited by the claims which, of course, embrace equivalents thereof.

We claim:

1. A growth medium moisture replacement apparatus which comprises a first container for growth medium, a second enclosed container for water, and a wick which extends between said first container and said second container, said wick comprising a rope member having a first end, a second end and a middle portion, and a sheath which surrounds said middle portion of said rope member to control the wicking of moisture along said rope member, said first container defining an opening in a bottom thereof, and wherein said wick extends through said opening so that said first end thereof is located within growth medium in said first container, said second end is located in water in said second container, and said sheath is sealed to said opening.

2. A growth medium moisture replacement apparatus as claimed in claim 1, wherein said sheath is water impermeable.

3. A growth medium moisture replacement apparatus as defined in claim 2, wherein said sheath is made of plastic.

4. A growth medium moisture replacement apparatus as defined in claim 1, wherein said rope member is made of nylon.

5. A growth medium moisture replacement apparatus as defined in claim 1, wherein said second enclosed container defines a bottom portion defining a tray and a removable top portion which includes a hole therein for positioning of said first container above the tray.

6. A growth medium moisture replacement apparatus as defined in claim 5, including a plurality of first containers with wicks positioned in respective holes in said removable top portion of said enclosed container.

7. A plant growth container comprising:
   a bottom end and one or more walls projecting upwardly from the bottom end and forming an open-top; said bottom end and said one or more walls defining a volume;
   a wick sealingly extending through the bottom end of the container for transporting liquid from outside of said container to the defined volume, said wick having first and second ends; said first end extending downwardly from said bottom of the container and a said second end extending upwardly into the volume;
   a sheath shorter than the length of the wick covering all but end portions of the wick for stiffening the wick and ensuring transport of liquid in an upward direction.

8. The plant growth container of claim 7, wherein at least said one or more walls are transparent.

9. A system for germinating seeds or for growing plants comprising:
   a bottom reservoir for holding water comprising a base and at least one wall extending upwardly from the base,
   one or more plant growth containers, at least one container comprising a bottom end and one or more walls projecting upwardly from the bottom end and forming an open-top; said bottom end and said one or more walls defining a volume;
   a wick sealingly extending through the bottom end of the container for transporting liquid from outside of said container to the defined volume, said wick having first and second ends; said first end extending downwardly from said bottom of the container and a said second end extending upwardly into the volume;
   a sheath, shorter than the length of the wick, receiving all but end-portions of the wick for stiffening the wick and ensuring transport of liquid in an upward direction, and
   a top rack superposed above or on the reservoir for receiving said one or more plant growth containers, and for positioning said one or more plant growth containers above the reservoir allowing the first end of the wick to extend into the reservoir.

10. The system of claim 9, including a support rack for supporting said top rack above a surface and preventing benching of said wick when said support rack is removed from above or on said reservoir.

11. The system of claim 9, including a float for determining the water level in said reservoir.

* * * * *